Figure 1:
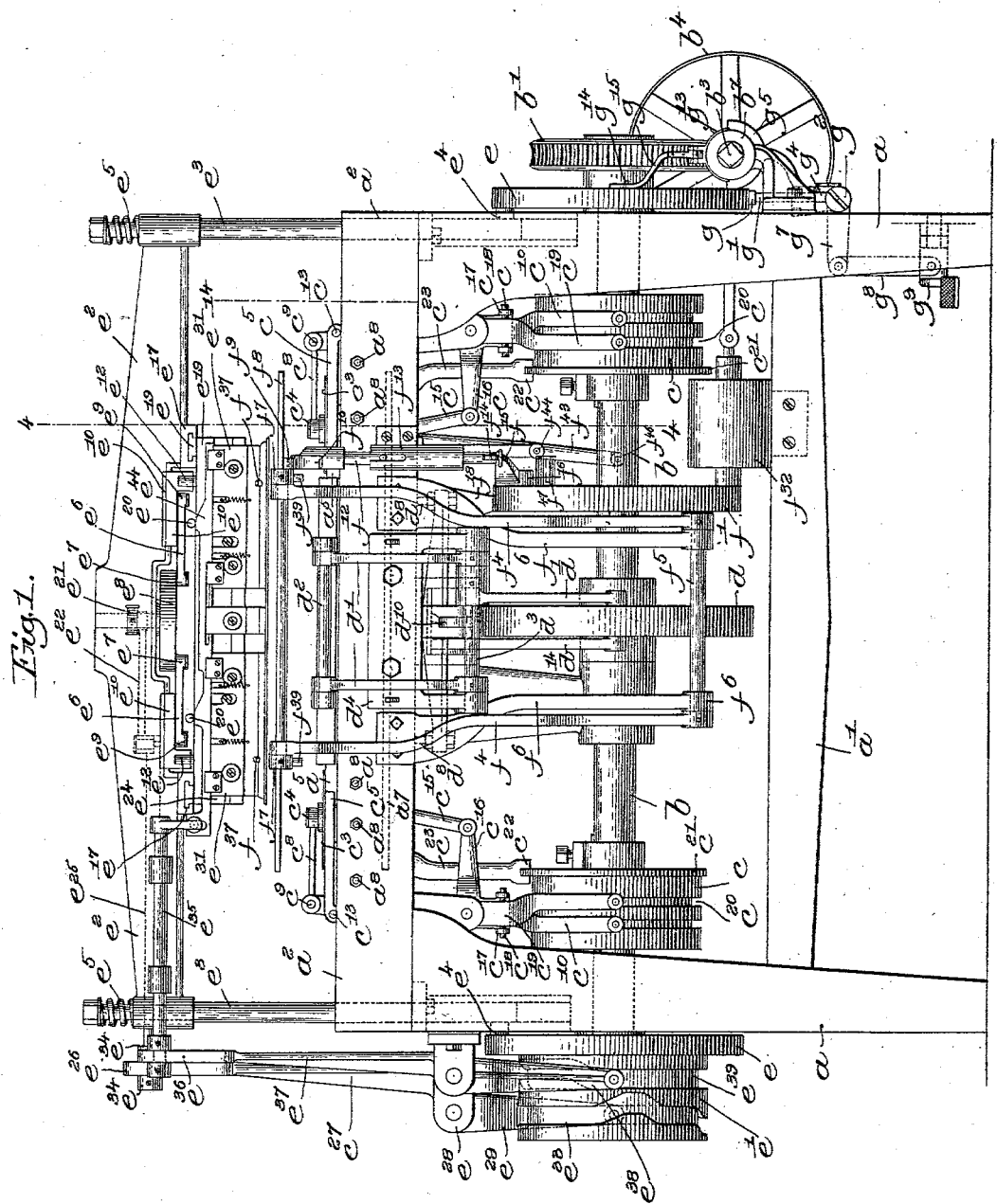

No. 694,844. Patented Mar. 4, 1902.
W. W. & W. L. DIXON.
MACHINE FOR FOLDING COLLAR BLANKS, &c.
(Application filed Feb. 14, 1901.)
(No Model.) 7 Sheets—Sheet 1.

Witnesses:
Fred S. Greenleaf.
M. C. Lunsford.

Inventors.
William W. Dixon,
Walker L. Dixon,
by Crosby Gregory
Attys.

No. 694,844. Patented Mar. 4, 1902.
W. W. & W. L. DIXON.
MACHINE FOR FOLDING COLLAR BLANKS, &c.
(Application filed Feb. 14, 1901.)
(No Model.) 7 Sheets—Sheet 3.

Witnesses:
Fred S. Greenleaf
W. C. Sunsford

Inventors.
William W. Dixon
Walter L. Dixon
By Crosby Gregory
attys

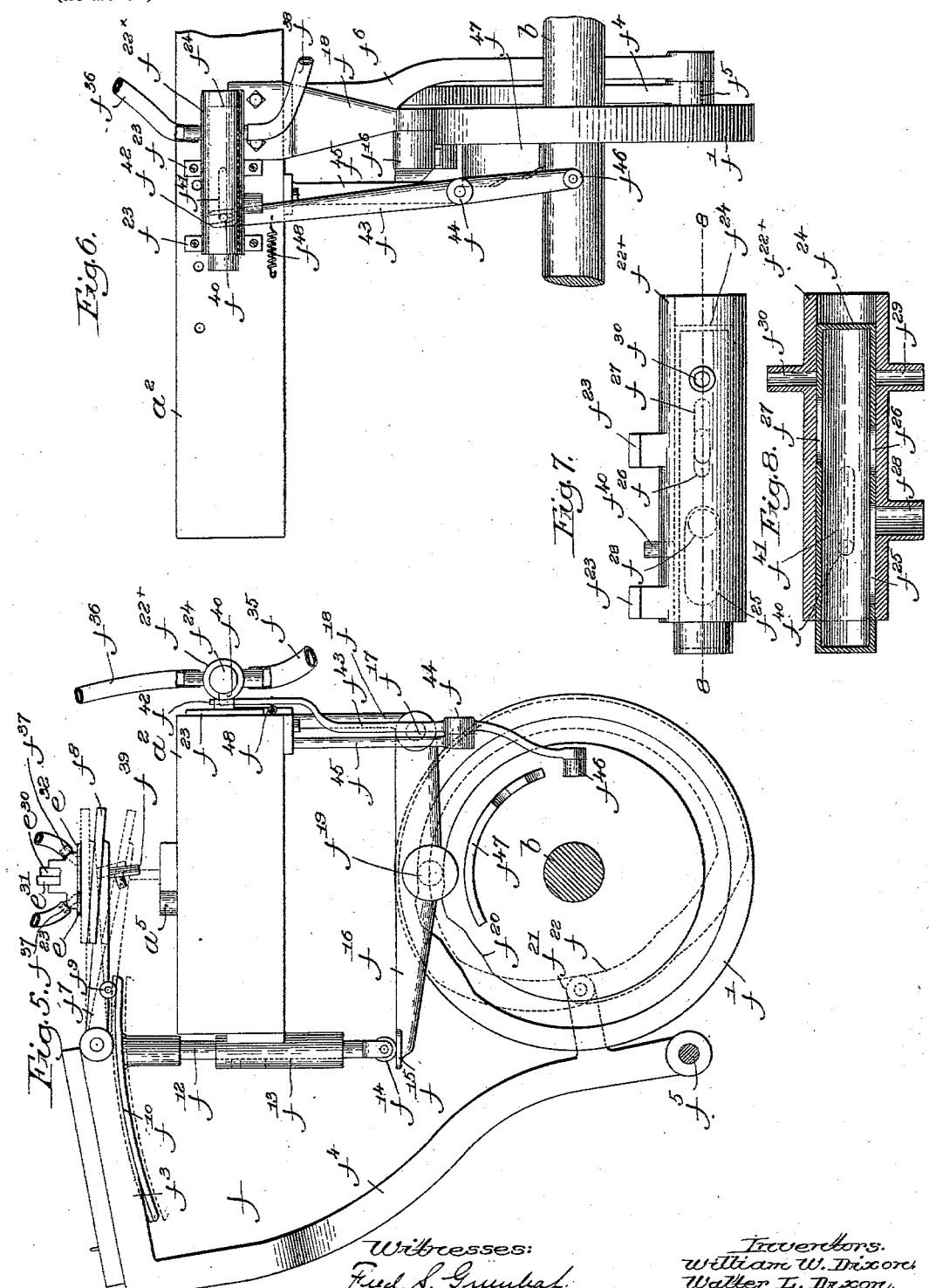

No. 694,844. Patented Mar. 4, 1902.
W. W. & W. L. DIXON.
MACHINE FOR FOLDING COLLAR BLANKS, &c.
(Application filed Feb. 14, 1901.)
(No Model.) 7 Sheets—Sheet 6.
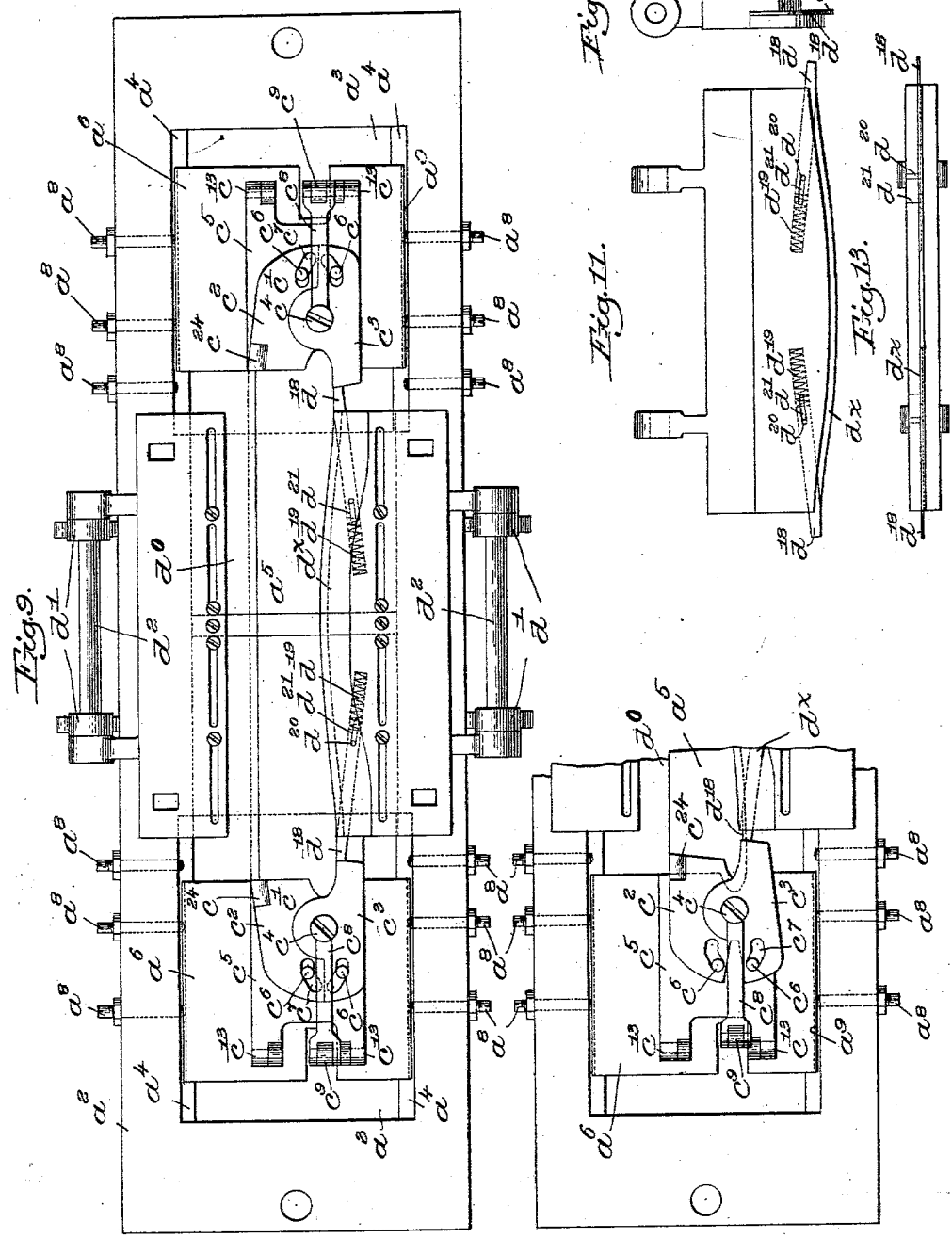

No. 694,844. Patented Mar. 4, 1902.
W. W. & W. L. DIXON.
MACHINE FOR FOLDING COLLAR BLANKS, &c.
(Application filed Feb. 14, 1901.)
(No Model.) 7 Sheets—Sheet 7.
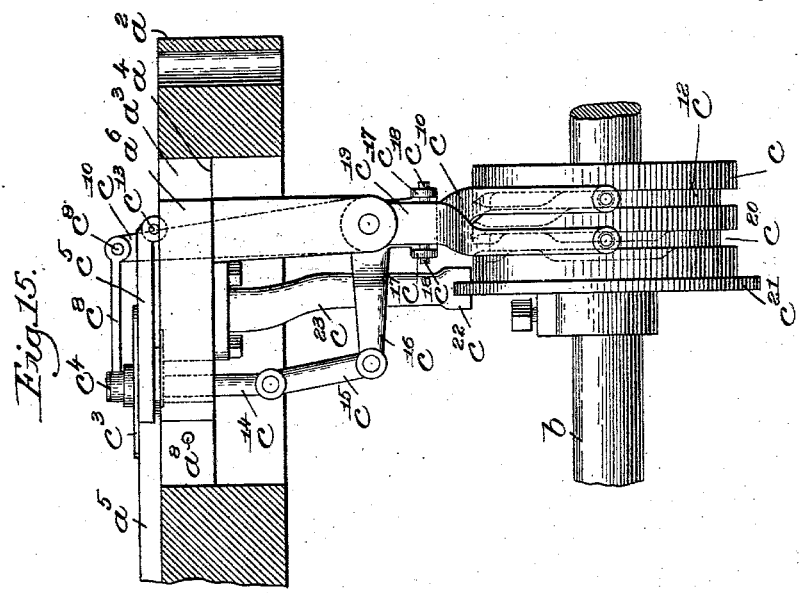
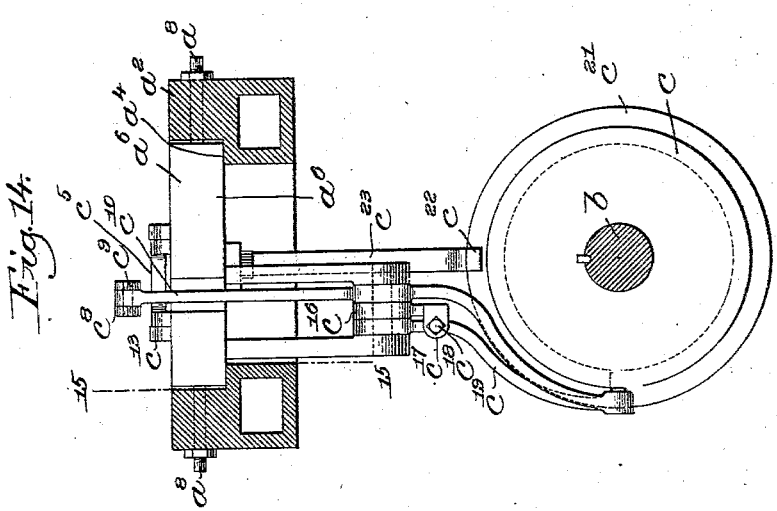
Witnesses:
Fred S. Greenleaf
W. C. Lunsford
Inventors.
William W. Dixon,
Walter L. Dixon,
By Crosby Gregory
Attys.

UNITED STATES PATENT OFFICE.

WILLIAM W. DIXON AND WALTER L. DIXON, OF BOSTON, MASSACHUSETTS, ASSIGNORS TO REECE FOLDING MACHINE COMPANY, OF PORTLAND, MAINE, AND BOSTON, MASSACHUSETTS.

MACHINE FOR FOLDING COLLAR-BLANKS, &c.

SPECIFICATION forming part of Letters Patent No. 694,844, dated March 4, 1902.

Application filed February 14, 1901. Serial No. 47,271. (No model.)

*To all whom it may concern:*

Be it known that we, WILLIAM W. DIXON and WALTER L. DIXON, citizens of the United States, residing at Boston, in the county of Suffolk and State of Massachusetts, have invented an Improvement in Machines for Folding Collars and the Like, of which the following description, in connection with the accompanying drawings, is a specification, like letters on the drawings representing like parts.

Our invention is a machine for folding collars, cuffs, and similar articles, and has for its object the provision of extremely simple and inexpensive mechanism for effecting the requisite movements with a minimum power, great precision, and including many novel details of movement and operation. There have been a large number of machines of this general character invented, most of the power-machines being quite complicated and very expensive to manufacture, this being particularly true where it has been attempted to feed the blanks automatically to the machine.

In our present invention we provide pneumatic mechanism for placing and removing the blanks on and from the bed of the machine. Also it has been one of our chief endeavors to obviate the expensive construction and multiplicity of parts heretofore considered necessary, and we have succeeded in reducing the machine to one driving-shaft, doing away with all gears and introducing such mechanism and movements as to enable the machine to operate with extreme ease, rapidity, and economy.

The constructional details of our invention will be more fully pointed out in the course of the following description, and the operation thereof will be fully set forth and the invention more particularly defined later on, reference being had to the accompanying drawings, in which we have shown preferred embodiments of the invention.

Figure 2:
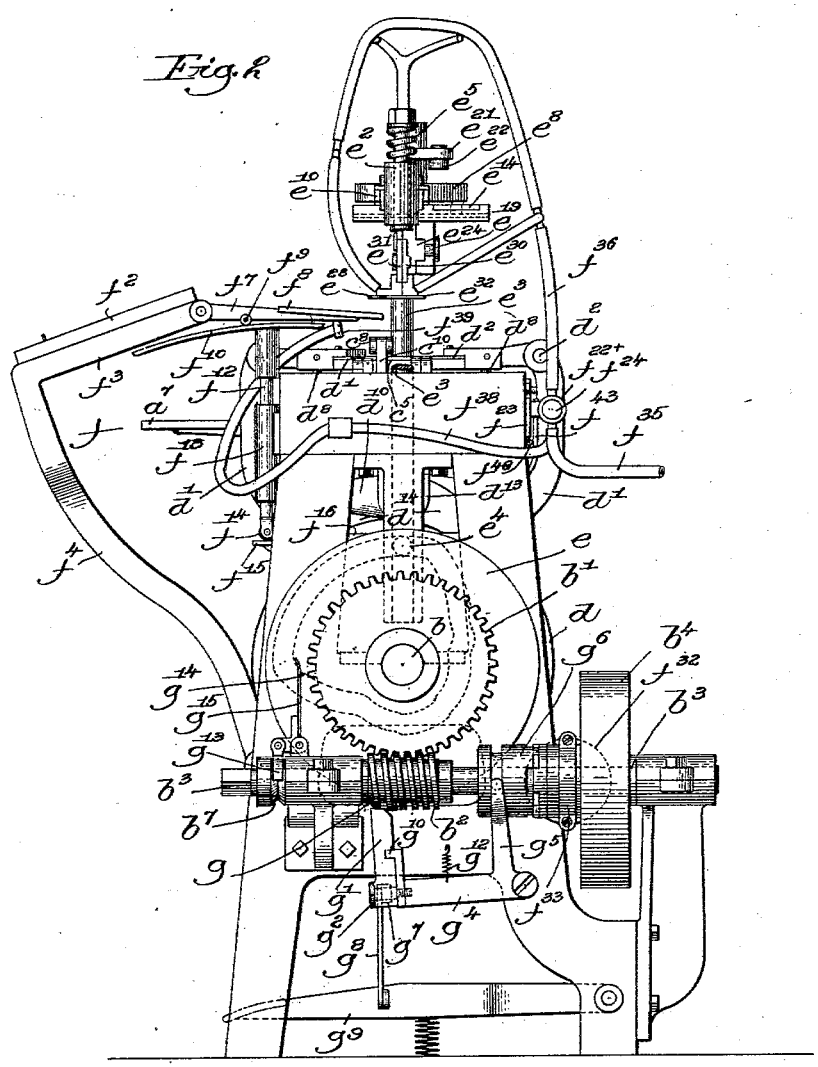
Figure 3:
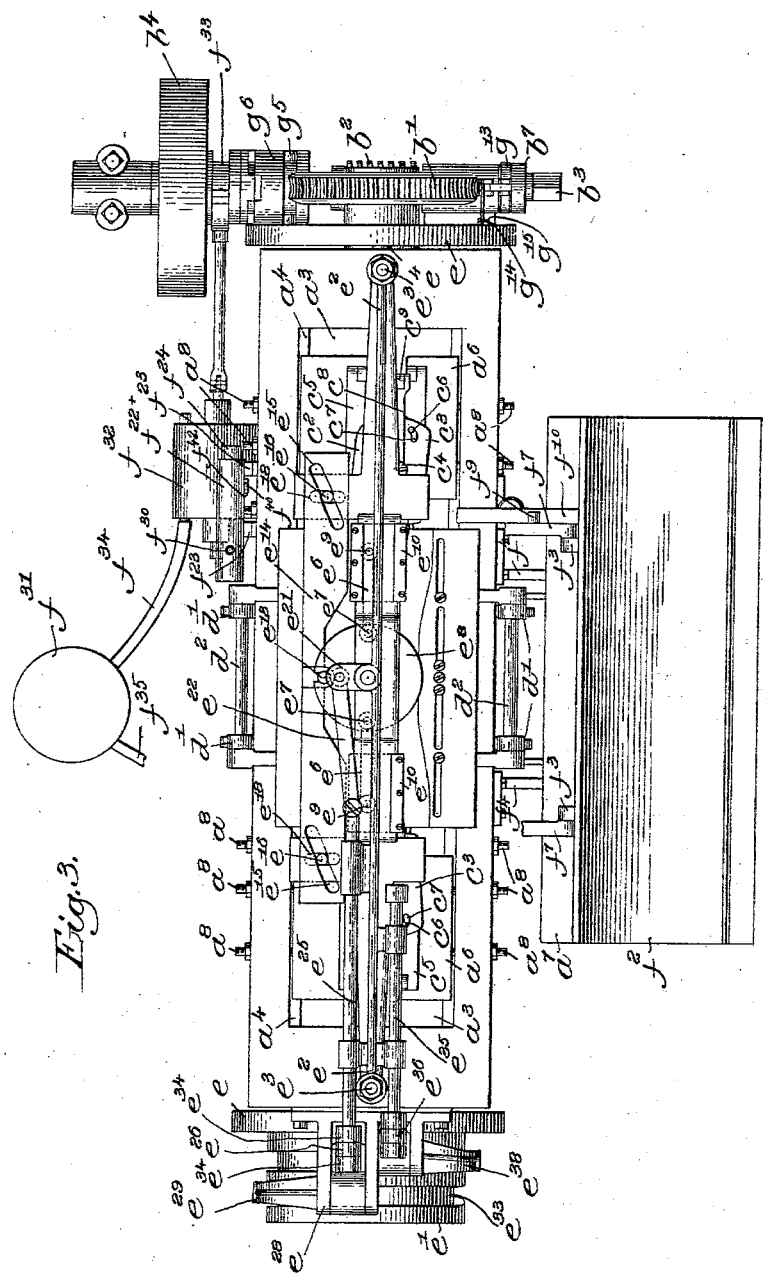
Figure 4:
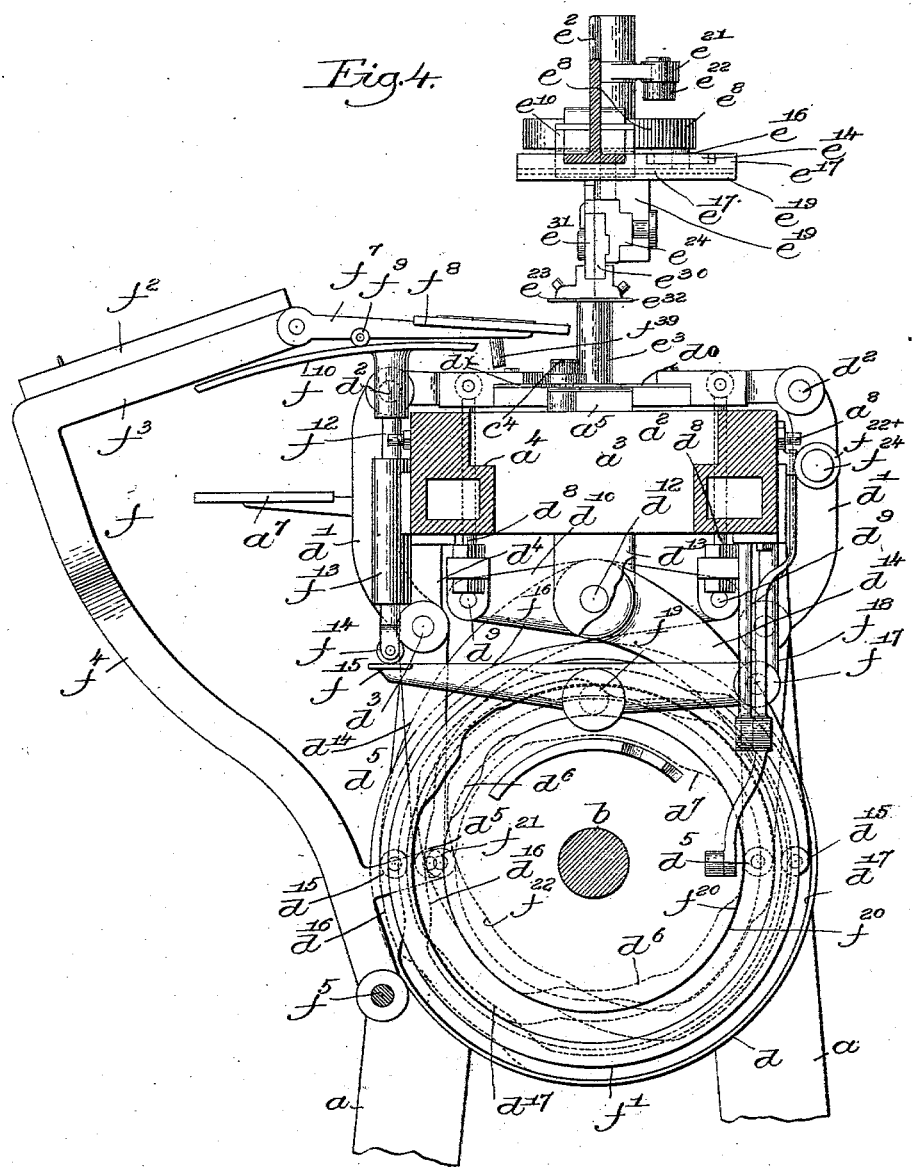

Figure 1 shows the machine in front elevation. Fig. 2 is a side elevation thereof. Fig. 3 is a top plan view thereof. Fig. 4 is a vertical cross-sectional view taken on the line 4 4, Fig. 1, the folding mechanism being mainly omitted, said figure showing the feeding mechanism in the position assumed when carrying a blank into the machine. Fig. 5 is an enlarged detail showing the parts in end elevation and showing the feeding mechanism in position for delivering a blank to the die. Fig. 6 is a fragmentary detail, in rear elevation, showing the valve mechanism. Figs. 7 and 8 are enlarged details of the special valve employed, the former figure showing the same in rear side elevation and the latter in vertical section on the line 8 8, Fig. 7. Fig. 9 is a top plan view of the bed of the machine and folding mechanism. Fig. 10 is a similar view showing a fragmentary detail of one end thereof, the parts being in the position assumed in making a fold. Figs. 11, 12, and 13 are views, respectively in bottom plan, end elevation, and side elevation, of the front folder or folding-blade. Fig. 14 is a vertical cross-sectional detail on the dotted line 14, Fig. 1, showing in end elevation one of the end folding-knives and operating mechanism therefor. Fig. 15 is a vertical longitudinal section on the line 15 15, Fig. 14, showing the end folding-blade and operating mechanism therefor in front side elevation.

It will be understood that the framework, driving power, and general arrangement of the machine may be varied to suit the particular folding work in hand, the same, as herein shown, comprising end uprights $a$, connected adjacent their lower ends by a cross-bar $a'$ and at their upper ends supporting the upright bed-frame $a^2$, the latter containing an open space $a^3$ and ledges $a^4$, on which may be mounted a usual receiving-pad $a^5$ and adjustable blocks $a^6$, carrying the end folding-blades.

A main shaft $b$ is journaled in the frame of the machine and carries all the rotary parts which serve directly to operate the various moving parts of the machine, the actuating devices employed being cams. This feature of the invention is of decided importance, as it enables us to do away entirely with expensive gears and reduces the number of parts, as well as the expense of the machine, to a minimum.

It will be understood that the shaft $b$ may be driven in any manner desired; but preferably it is driven by a worm and worm-wheel arrangement, the worm-wheel $b'$ being shown as mounted at the extreme right end, in mesh with a worm $b^2$ on a cross-shaft $b^3$, provided with a loose pulley $b^4$.

This machine belongs to that type of folding-machines in which the blank to be folded is held down by a die operated by a cross-head and while so maintained is folded by end folders or folding-blades and front and rear blades, the die being contractible for withdrawal from one or more of the folds, as may be desired, according to the order of folding which may be employed, and, as herein shown, the end folding-blades are operated by a cam $c$, splined on the shaft $b$ adjacent its opposite ends, and the side folding-blades are operated by a cam $d$. The cross-head is raised and lowered by opposite cams $e$ and is shifted by a cam $e'$, while preferably at the front of the machine is mounted a feeding apparatus $f$, operated by a cam $f'$.

As the feeding mechanism constitutes an important part of the present invention, it may be well to describe it at this point in all its details.

The blanks are laid for convenience on a table $f^2$, shown as extending in front of the machine and preferably carried on the elbows $f^3$ of arms $f^4$, fixed at their lower ends on a shaft $f^5$, journaled in brackets $f^6$, depending rigidly from the bed-frame $a^2$. At their upper and inner ends the elbows or arms $f^3$ carry pivoted supporting-fingers $f^7$, which support at their inner ends a feed-plate $f^8$, which may be of any shape and arrangement desired and is preferably simply a board provided with the required flanges or other means for properly placing and maintaining in position the blanks which are to be fed in the machine. The supporting-fingers $f^7$ are maintained in proper position by a roll $f^9$, which travels on a suitably-disposed guide-track $f^{10}$ at the upper end of a lifter or lifting-post $f^{12}$, mounted in a socket $f^{13}$ and provided at its lower end with a roller $f^{14}$, resting on the free end $f^{15}$ of a lever $f^{16}$, pivoted at $f^{17}$ in a bracket $f^{18}$. The lever $f^{16}$ is operated by a roll $f^{19}$, running in a path $f^{20}$ in the cam $f'$, being positively lifted and correspondingly lowered once in each rotation of the cam, these movements taking place during the period of rest of the cross-head, or at least while the cross-head is up. The arm $f^4$ is operated by a roll $f^{21}$, traveling in a path $f^{22}$ of the cam $f'$, which serves to move the arm and feed-plate in and out for feeding the blanks into the machine and removing them from the machine.

As already noted, various feeding devices have been suggested; but the requirements of a machine of this character, which operates on more or less open-work fabric—such as linen, cotton, and other textile material—are of an exceedingly exacting and peculiar nature, so that it becomes necessary to provide a feeding mechanism which shall operate with absolute precision, leaving no possibility of any shifting or distortion of the blank from any cause and not damaging the goods by cutting a thread or making holes, as in the case of pricking devices.

We have succeeded in producing a delicate, positive, and certain feeding apparatus which meets the requirements specified, said apparatus employing pneumatic suction and being shown in detail in Figs. 5 to 8. Referring to said figures, it will be seen that on the back of the bed-frame is mounted a cylinder $f^{22\times}$ by brackets or other suitable means $f^{23}$, in which operates a peculiar plunger $f^{24}$, shown as a hollow elongated shell provided on one side with a long opening $f^{25}$ and a short opening $f^{26}$ and on the opposite side with a medium opening $f^{27}$, arranged to register, respectively, with an exhaust-port $f^{28}$ and outlet-ports $f^{29}$ $f^{30}$, the air control being effected by a tank or reservoir $f^{31}$, (see Fig. 3,) kept at any predetermined state of vacuum by a pump $f^{32}$, herein shown as located at the rear of the machine and operated by an eccentric $f^{33}$, arranged to be continuously operated by the pulley $b^4$, the pump, tank, and valve being properly connected by pipes $f^{34}$ $f^{35}$. From the port $f^{30}$ a conducting-tube $f^{36}$ leads to the cross-head and is connected by suitable branches to the die-plate $e^{23}$ $e^{32}$, the latter being herein shown as provided with four nipples $f^{37}$, two adjacent each end, so that the suction will be applied simultaneously adjacent the four corners of the blank as the latter is lifted by the feeding-plate $f^8$ against the under side of the forming-die. The port $f^{29}$ is connected by a similar tube $f^{38}$ to the feed-plate, which has on its under side, adjacent its opposite end, depending sucker-tubes $f^{39}$, arranged to contact with the folded blank on the folding-pad of the machine when the feeding-plate $f^8$ is lowered, thereby instantly lifting the folded blank and carrying the same out of the machine as the feeding mechanism is moved backwardly by the cam $f^{22}$, the blank being dropped at the proper moment onto a table $a^7$ at the front of the machine.

The operation of the valve is as follows: The plunger $f^{24}$ has a pin $f^{40}$ projecting through a slot $f^{41}$ in the cylinder and engaged by the forked end $f^{42}$ of a lever $f^{43}$, pivoted at $f^{44}$ to a bracket $f^{45}$ and carrying a roll $f^{46}$ at its free end in the path of and to be engaged by a cam-surface $f^{47}$, mounted on the face of the cam-wheel $f'$, as is clearly shown in Figs. 5 to 8, which moves the lever $f^{43}$ in opposition to a spring $f^{48}$.

The normal position of the parts is shown in Figs. 6 to 8, and the first movement of the plunger $f^{24}$ to the right serves to bring into action the port $f^{30}$, at which time the feeding-plate $f^8$ has just reached its innermost position and has been raised by the lifter $f^{12}$, so as to carry the blank against the under side of the raised forming-die, the result being that as the blank touches said die it is seized and held accurately by the suction at its ends without the possibility of shifting its position, and the blank having thus been delivered to the die the feed-plate is instantly lowered by the lifter $f^{12}$, and as the suction-tubes $f^{39}$ thereof touch the folded blank resting on the bed-pad the valve-plunger $f^{24}$ is moved still farther to the right, Figs. 6 and 8, thereby bringing into action the port $f^{29}$, whereupon the powerful suction thereof operates through the tubes or apertures $f^{39}$ to engage the folded blank, whereupon the feed-plate is raised slightly and moved forward to the front of the machine over the table $a^7$, and at this point the spring $f^{48}$ is permitted to retract the valve-plunger $f^{24}$, cutting off both the ports $f^{29}$ $f^{30}$ and permitting the folded blank to drop on the table $f^7$ and leaving on the folding-pad the blank which has meanwhile been lowered into position by the cross-head and die.

The feeding apparatus thus far described is capable of wide variation in form and arrangement as long as the suction principle is carried out, as above explained, the advantage thereof being that it retains the blank with a tenacity and certainty which mechanical means—such as springs, pins, pinching devices, &c.—fail to exert. The suction device positively maintains the blank against the die in close contact therewith, and as long as the suction operates it is impossible that the blank can change its position. This is the result which is essential to proper folding of collar and cuff-blanks and similar articles made of woven material.

Instead of applying the suction to the die, as shown, it may be applied to the bed for retaining the blank, and, if desired, the suction of the die may be depended upon for raising the folded blank by properly timing the valve operation therefor.

Any suitable kind of a die may be employed in our machine, the kind herein illustrated being that shown and fully explained in the application of George Reece, Serial No. 35,942, filed November 9, 1900, comprising the corner portions or blades $e^{23}$ $e^{32}$, carried by front and rear blade holders $e^{31}$ $e^{30}$, mounted at the front side of a slide block or carrier $e^{24}$, supported in a carrier bar or plate $e^{19}$, the blade-holder $e^{31}$ being actuated by the engagement of a cam-bar $e^{44}$ with rolls $e^{20}$ on the carrier bar or plate $e^{19}$, all substantially the same as in said Reece application, therefore not requiring further description.

For convenience and simplicity of illustration we have shown the former or die as constituting the means for holding the blank in place; but it will be understood that either a former or other independent means may be employed for holding the blank down upon the bed.

We prefer to mount the die in a vertically-moving cross-head, and for this purpose I provide a transverse beam $e^2$, provided at its under side with dovetailed grooves $e^{17}$, in which the top of the plate $e^{19}$ is slidingly mounted, said beam being supported at its ends on shouldered rods $e^3$, slidingly mounted in the frame of the machine and provided with lifting-rolls $e^4$ at their lower ends, engaged by the path-cams $e$, already described.

It is of great importance in this class of folding that the blank should be pressed with all the weight possible and should be capable of yielding for different thicknesses of work, and accordingly we have provided springs operating to press the former forcibly downward on the blank on the bed of the machine, the present machine being preferably so constructed that the entire die, cross-head, beam, and actuating parts will bring their combined weight upon the blank, being, however, capable of yielding, if necessary, by reason of springs $e^5$ on the rods $e^3$ above the ends of the beam $e^2$.

In order to secure extreme accuracy of movement, the longitudinal shifting movements of the die are effected positively by links $e^6$, pivoted at their inner ends $e^7$ to a rotary wheel or plate $e^8$ and at their outer ends $e^9$ to slides $e^{10}$, mounted on the beam $e^2$ and engaging rolls $e^{12}$, projecting upwardly from the plate $e^{19}$, thereby giving the desired contracting and expanding movements of the die. The rotary plate $e^8$ is journaled in the beam $e^2$ and is also provided at its rear side with a pin $e^{13}$, in engagement with a slide-bar $e^{14}$, provided with cam-slots $e^{15}$ at its ends, in which operate pins $e^{16}$, which extend upwardly from the top of the plate $e^{19}$ through slots $e^{18}$, formed in rearward extensions of the beam $e^2$, in which the said tops of the carrier bar or plate $e^{19}$ have a dovetailed sliding engagement, as is clearly shown in Fig. 1, so that as the bar $e^{14}$ is moved lengthwise the die is correspondingly shifted forwardly or rearwardly, as the case may be. The rotary plate $e^8$ is actuated by a crank $e^{21}$, fast on the spindle of said plate and connected by a link $e^{22}$ to a rod $e^{25}$, slidingly mounted in the slotted end $e^{26}$ of a lever $e^{27}$, pivoted in a bracket $e^{28}$ on the end of the machine and having an offset arm $e^{29}$ in engagement with a path-cam $e^{33}$ of the cam $e'$. The rod $e^{25}$ is provided with collars $e^{34}$, which hold it in place relatively to the slotted end $e^{26}$ of its actuating-lever. The cam-bar $e^{44}$ is reciprocated in a similar manner by a rod $e^{35}$, carried in the slotted upper end $e^{36}$ of a similar lever $e^{37}$, whose lateral arm $e^{38}$ engages a path $e^{39}$ of the cam $e'$.

Referring now to the folding mechanism, and particularly to Figs. 1, 4, 9, to 15, it will be seen that we have herein illustrated the machine as adapted for folding stand-up collars. As is well understood in this art, the great difficulty in practically folding collar-blanks by an automatic machine is that the great number of movements which are required cannot be effected quickly enough to fold over and crease the blanks before the latter have become dried, resting as they do on a heated bed, and the folding-blades also being usually more or less heated by their proximity to said bed. Accordingly the present invention includes provision for simultaneously folding three sides of the blank, the fourth side also being preferably folded before the other folding-blades have been removed. As herein shown, there is one front edge-folding blade $d^\times$, one rear edge-folding blade $d^0$, and a compound blade $c'$ for each end, each of these blades excepting the back blade being of special construction. The end blade $c'$ comprises two parts $c^2$ $c^3$, pivoted together at $c^4$ and mounted on a plate $c^5$, the latter being provided with pins $c^6$, coöperating with cam-slots $c^7$ in the members $c^2$ $c^3$ for giving the latter a shear-like or pivotal movement as they are moved forward by an arm $c^8$, pivoted at $c^9$ to an actuating-lever $c^{10}$, operating in a path $c^{12}$ of the cam $c$. The plate $c^5$ is pivoted at $c^{13}$ to a bed-block $a^6$, so that it may rise and fall as required in the folding operations, being raised and lowered by a post $c^{14}$, lifted by a link $c^{15}$, actuated by a bell-crank $c^{16}$, provided at its opposite end with ears $c^{17}$ and adjusting-screws $c^{18}$, bearing against a pressing-lever $c^{19}$, actuated by a path-cam $c^{20}$ of the cam $c$. The adjustment of the screws $c^{18}$ provides the requisite amount of lost motion and adjustability for accommodating the machine to different thicknesses of cloth. The block $a^6$ is held in place in the bed of the machine by a series of bolts $a^8$ entering the grooves $a^9$ therein, this provision being of advantage, as it permits the accurate adjustment of the block, as by tightening or loosening certain of the bolts $a^8$ the block may be shifted to one side or the other or may be turned slightly one way or another to accommodate the various requirements of folding.

Another feature of importance resides in providing the cam $c$ with a flange $c^{21}$, engaged by the bifurcated end $c^{22}$ of a rigid lug $c^{23}$, depending from the under side of the block $a^6$, thereby insuring that when the block is adjusted the cam $c$ will necessarily be adjusted simultaneously and to identically the same extent. Both the front and rear folding-blades are similarly actuated, and hence a description of the operating mechanism of one will answer for both. Each blade is moved in and out by a pair of levers $d'$, connected thereto at $d^2$ and pivoted at $d^3$ to brackets $d^4$ and operated by a roll $d^5$, traveling in a path $d^6$ or $d^7$, respectively, of the cam $d$, and is lifted by a presser-rod $d^8$, pivoted at $d^9$ to a lever or arm $d^{10}$, supported on a pivot $d^{12}$ in brackets $d^{13}$, and having an offset arm $d^{14}$, provided at its free end with a roll $d^{15}$, actuated by a path $d^{16}$ or $d^{17}$, respectively. This arrangement is not only extremely compact, but gives a balanced construction and great strength to the machine.

As already stated, the front and end blades move inwardly simultaneously, and accordingly in order to prevent the liability of pinching the cloth between the approaching and preferably finally meeting edges of the end blades and the front blade we provide auxiliary folders $d^{18}$. (Shown clearly in the under side view of the front blade, Fig. 11, taken in connection with the adjacent end and edge views.) These auxiliary folders $d^{18}$ are arranged to slide in the main blade, being normally held outward by a spring $d^{19}$ and being retained by a pin $d^{20}$, operating in a slot $d^{21}$ in the blade-plate. These auxiliary folders normally project forward in contact with the end blades, as shown in Fig. 9, and as the end blades move toward each other they gradually push the folders $d^{18}$ backward until the parts are in the position shown in Fig. 10, the ends of the folders $d^{18}$ meanwhile performing identically the same office as the folding edge of the blade $d^\times$ by folding over the edge of the cloth at the gap between the two main blades. In other words, the auxiliary folders coöperate with the main folders in preserving a continuous folding edge throughout the entire length of the collar, thereby preventing any pinching or irregularity in folding.

It will be understood that the auxiliary folders will be shaped and located in a moving part to suit the particular requirements of the various styles of collars or other articles to be folded and are of the same practical advantage, whether the blades move simultaneously or dissimultaneously and also whether or not the folders move simultaneously. The front and end blades having moved inwardly and performed their folding-function and the die having been properly retracted and restored on top of the blank in the manner fully described in the before-mentioned application, the rear blade $d^0$ is moved forward and infolds the rear edge of the blank or, as shown, the top of the collar, and in making this fold the rear inner corners of the end folding-blades at $c^{24}$ perform the function of the former or die, said corner $c^{24}$ being cut away or made thin to hold or properly define the corner fold of the collar, the latter being infolded at the corner on top of said thin portion $c^{24}$ of the end blade.

The difficulties of handling textile blanks have already been alluded to; but such are the peculiarities and unexpected difficulties that are continually arising, especially in folding a plurality of thicknesses of linen and cotton blanks, that it becomes necessary to have the machine under special control, and accordingly we have provided a cam-lump $q$ on the periphery of the cam $e$ to engage a dog or arm $g'$ of a bell-crank, which is pivoted at $g^2$ to the free end $g^4$ of a knock-off lever, whose bifurcated end $g^5$ engages a chuck $g^6$ for connecting and disconnecting the driving-pulley $b^4$ to the shaft $b^3$. The other arm $g^7$ of the bell-crank lever is connected by a link $g^8$ to a foot-lever $g^9$, and the arm $g'$ of said bell-crank is mounted between opposite lugs $g^{10}$, projecting rigidly up from the lever $g^4$ in position to permit the arm $g'$ to swing laterally into and out of alinement with the cam $g$. Thus the machine will be automatically stopped every time that the lump $g$ rotates into engagement with the arm $g'$, this movement serving to depress the lever $g^4$, and thereby uncouple the chuck $g^6$, and the machine may be instantly started simply by momentarily depressing the foot-lever, this movement serving to turn the arm $g'$ out of engagement with the lump $g$, permitting the lever $g^4$ to be pulled upwardly by a spring $g^{12}$, thereby throwing the chuck into driving engagement. Also by the mechanism described the machine may be instantly stopped at any point simply by depressing the foot-lever and holding it depressed, as the arm $g'$ upon moving out of engagement with the lump $g$ comes into contact with the inner lug $g^{10}$, and any further downward pull on the arm $g^7$ serves positively to swing downwardly the lever $g^4$, and thereby stop the machine.

In order that the machine shall stop instantly when the cross-head has been raised to the position shown in Fig. 2, we provide a brake $g^{13}$, operated by the engagement of a pin $g^{14}$ with a yielding finger $g^{15}$, said brake engaging a collar $b^7$ on the shaft $b^3$.

In the course of the detailed description thus far given the operation of the machine has been quite fully set forth, and it may therefore be briefly summarized.

The shaft $b$ having been started by a momentary depression of the foot-lever $g^9$, the feeding mechanism first comes into operation, the feed-plate being moved from the full-line position, Fig. 4, to the full-line position, Fig. 5, and thereupon the lifter $f^{12}$ raises the plate $f^8$ and the blank carried thereby against the under side of the raised die, and instantly the vacuum from the tank $f^{31}$ is brought into action, thereby causing the blank to be held firmly by suction against the under side of the die. This operation is accomplished instantaneously and immediately the feed-plate is lowered against the folding pad of the bed of the machine, and the suction apparatus is brought into operation upon the feed-plate, thereby causing the folded blank to adhere thereto, whereupon the feed-plate is raised and immediately moved outward. Meanwhile the cams $e$ have lowered the cross-head into position, carrying the blank down with it, and the latter is firmly pressed on the receiving-pad by the die, and thereupon the exhaust apparatus is cut off both from the die and from the feeding-plate, permitting the former to move freely in its various required operations without disturbing the blank and permitting the feeding-plate to drop the folded blank onto the table $a^7$. Thereupon the front and end folding-blades move inwardly and perform their folding operations, being first raised by the lifters $c^{14}$ $d^8$, so as to lift and fold over the projecting edges of the blank, the succeeding inward or folding movements being effected by the levers $c^{10}$ and $d'$. As the blades move forward the auxiliary folders $d^{18}$ maintain a continuous folding edge and prevent any disturbance or pinching of the fabric between the approaching blades. The said folds having been made, the die is shifted by the combined action of the rotary plate $e^8$ and the cam-bar $e^{41}$, actuated by the bars $e^{25}$, $e^{35}$, cam $e'$, and connected parts, and then the rear folding-blade is raised by its lifter $d^8$ and moved inwardly by its levers $d'$, all the movements of both of the edge folding-blades being effected by the single cam $d$, and all the movements of the end blades by the single cam $c$, and all the movements of the die by the single cam $e'$. Then the cross-head again moves up, the rods $e^{25}$ $e^{35}$ sliding up freely in the slotted upper ends of their actuating-levers and the cross-head being lifted by the cams $e$, whereupon the described cycle of operations is repeated.

Besides the advantages already pointed out there are many other advantages of the present mechanism which will be readily understood by those skilled in the art; but, as already noted, the leading advantages of the present invention reside, first, in providing accurate and instantly-operating suction-feed, thereby making it practical to feed the blanks automatically to the machine, and, second, in providing a compact mechanism entirely without gears, the latter being not only expensive and liable to rapid deterioration, but difficult to keep in proper adjustment and accurate movement, requiring undue power to operate them, becoming readily fouled, &c. We have not undertaken at this point to enumerate all the salient and advantageous features of our invention, and various of them will be pointed out in the following claims. It will also be understood that while we have herein shown the preferred embodiment of our invention we are well aware that very many changes and rearrangements of parts may be resorted to without departing from the spirit and scope of our invention, and likewise various features of our invention may be employed advantageously together without others thereof—as, for example, while we have shown a machine for folding all the sides of a blank we do not limit the invention thereto nor to the order of folding, and so, also, we are not limited to the vertically-sliding cross-head, and the same remark applies in general to many of the features of the case, as will be made more apparent by the differing scope of the following claims, and while we have shown the parts as we prefer to locate them we wish it understood that, especially for certain other forms of folding, some of the parts—as, for instance, the pumping apparatus and connections—will be otherwise located than as shown.

Having described our invention, what we claim, and desire to secure by Letters Patent, is—

1. In a machine for folding collars and the like, a receiving-bed to receive a blank to be folded, folding mechanism for infolding said blank, and means for holding the blank, combined with pneumatic apparatus for receiving and retaining the blank in position to be held and operated upon by the aforesaid mechanism.

2. In a machine for folding collars and the like, a receiving-bed to receive a blank to be folded, folding mechanism for infolding said blank, and means for holding the blank, and pneumatic apparatus having connection with said former for retaining a blank against the under side of said former for proper positioning in the machine.

3. In a machine for folding collars and the like, a receiving-bed to receive a blank to be folded, folding mechanism for infolding said blank, means for holding the blank, said former having adjacent its opposite ends suction-places operative on the side of the former next to the receiving-bed for retaining a blank, an air-exhaust apparatus, connections therefrom to said suction-places, and operating mechanism therefor.

4. In a machine for folding collars and the like, a receiving-bed to receive a blank to be folded, folding mechanism for infolding the edges of said blank over flat down upon the body of the blank, means for holding the blank, and automatic feeding mechanism for removing a blank from the machine, said automatic mechanism including lifting means for directly grasping a blank lying on said bed and carrying said blank therefrom out of the machine.

5. In a machine for folding collars and the like, a receiving-bed to receive a blank to be folded, folding mechanism for infolding said blank, an automatic feeding mechanism for removing a blank from the machine when folded, said mechanism including a device for taking hold of the blank itself and removing it from the machine, said device being provided with means for positively holding the blank at a plurality of separated points in unchanging position against said removing device until the blank is out of the machine.

6. In a machine for folding collars and the like, a bed, folding mechanism, means for holding the blank, an automatic feeding mechanism adapted to engage a blank, feed it into the machine, and leave it there to be folded, and means for returning said feeding device and engaging the same with the folded blank yet upon the bed of the machine and take the blank out of the machine.

7. In a machine for folding collars and the like, a receiving-bed to receive a blank to be folded, folding mechanism for infolding said blank, means for holding the blank, and automatic feeding mechanism for carrying a blank into the machine, said feeding mechanism including means for delivering the blank directly to the machine, said machine having means for taking hold of the blank itself and holding it in position.

8. In a machine for folding collars and the like, a bed, devices to fold a blank, automatic means to directly grasp the blank adjacent its opposite ends, carry it into the machine, and deposit it in position on said bed to be folded.

9. In a machine for folding blanks for collars and the like, a bed and a former to sustain and hold a blank while being folded, and automatically-operated means to enter between the bed and former, descend upon, directly grasp the folded blank, and feed it out from between the bed and former.

10. In a machine for folding collars and the like, a bed, devices to fold a blank, means to directly grasp a blank to be folded and carry it in suspended position down onto the bed to be folded, and means to directly engage the folded blank and remove it from the machine.

11. In a machine for folding collars and the like, a receiving-bed to receive a blank to be folded, folding mechanism for infolding said blank, means for holding the blank, feeding mechanism for carrying a blank into the machine, and pneumatic apparatus for receiving the blank from said feeding apparatus and retaining the same in position in the machine for folding.

12. In a machine for folding collars and the like, a receiving-bed to receive a blank to be folded, folding mechanism for infolding said blank, means for holding the blank, automatic mechanism movable in and out between the bed and said holding means for removing a blank from the machine, said mechanism including suction apparatus for taking a folded blank from said bed and carrying it out of the machine.

13. In a machine for folding collars and the like, a receiving-bed to receive a blank to be folded, folding mechanism for infolding said blank, means for holding the blank, a feeding mechanism for carrying a blank into the machine, means for moving said apparatus adjacent the under side of said holding means, and pneumatic apparatus operating at said holding means for receiving the blank from said feeding mechanism and retaining the same in place for folding.

14. In a machine for folding collars and the like, a receiving-bed to receive a blank to be folded, folding mechanism for infolding said blank, means for holding the blank, feeding mechanism movable between said holding means and said bed, and means for shifting said feeding mechanism into engagement with said holding means for the transfer of a blank, and lowering the same onto said bed for the transfer of another blank.

15. In a machine for folding collars and the like, a receiving-bed to receive a blank to be folded, folding mechanism for infolding said blank, means for holding the blank, feeding mechanism movable between said holding means and said bed, and means for shifting said feeding mechanism into engagement with said holding means for the transfer of a blank, and lowering the same onto said bed for the transfer of another blank, and pneumatic apparatus operating on said holding means and also on said feeding mechanism for effecting said respective transfers.

16. In a machine for folding collars and the like, a receiving-bed to receive a blank to be folded, folding mechanism for infolding said blank, means for holding the blank, feeding mechanism including pneumatic apparatus for removing a blank when folded, pneumatic apparatus for receiving and retaining a blank in position for folding, said apparatus including a vacuum-tank, a valve, and connections, said valve including a cylinder and a hollow plunger, both provided with proper ports leading respectively to said tank and to said retaining apparatus and said removing apparatus, and means for operating said valve, the port leading to said retaining apparatus coming into operation before the port leading to said removing apparatus, and remaining open while the latter operates.

17. A machine for folding collars and the like, comprising a bed, folding apparatus, means to hold a blank in place for folding, an automatic feeding mechanism, said mechanism including an arm, means for moving said arm toward and from the machine, a feed-plate for carrying the blank, and means for moving said feed-plate up and down as it is moved by said arm.

18. A machine for folding collars and the like, comprising a bed, folding apparatus, means to hold a blank in place for folding, an automatic feeding mechanism, said mechanism including an arm, means for moving said arm toward and from the machine, a feed-plate for carrying the blank, a lifter for moving said feed-plate up and down as it is moved by said arm, and means for operating said lifter.

19. A machine for folding collars and the like, comprising a bed, folding apparatus, means to hold a blank in place for folding, and automatic feeding mechanism, said mechanism including an arm, means for moving said arm toward and from the machine, a feed-plate pivotally mounted on said arm, a lifter for swinging said feed-plate up and down as it is moved by said arm, and means for operating said lifter.

20. A machine for folding collars and the like, comprising a bed, folding apparatus, means to hold a blank in place for folding, automatic feeding mechanism for carrying a blank, said mechanism including means for retaining a blank while being carried, mechanism for moving said retaining means into and out of the machine, and a guide-track on which said retaining means travels.

21. A machine for folding collars and the like, comprising a bed, folding apparatus, means to hold a blank in place for folding, automatic feeding mechanism, said mechanism including means for retaining a blank while being carried, mechanism for moving said retaining means into and out of the machine, a lifting-post mounted in a socket on the machine, a guide-track carried by said post on which said retaining means travels, and means for raising and lowering said post in said socket.

22. A machine for folding collars and the like, comprising a bed, folding apparatus, means to hold a blank in place for folding, and automatic feeding mechanism including arms pivoted to the front of the machine, a table mounted on said arms obliquely to the horizontal, for supporting a pile of blanks to be fed into the machine, and means operated by said arms for feeding said blanks into the machine.

23. A machine for folding collars and the like, comprising a bed, folding apparatus, means to hold a blank in place for folding, a supporting device for carrying blanks into the machine, automatic means for operating the same, pneumatic mechanism for receiving the blank when carried into the machine, and pneumatic means for taking a folded blank from the machine, said latter pneumatic means holding the blank until the blank has been removed from the machine, and then releasing the blank.

24. In a machine for folding collars and the like, a bed to receive a blank, folding mechanism for infolding the edges of the blank, a former for defining the blank, a cross-head carrying said former, actuating means for moving said cross-head and former toward and from the bed, automatic feeding mechanism for feeding a blank into the machine when the former is in raised position, and pneumatic apparatus for taking the blank from said feeding mechanism, said pneumatic apparatus including operating means for maintaining the same in action until said actuating mechanism has lowered the former upon the bed of the machine.

25. In a machine for folding collars and the like, a receiving-bed, folding mechanism, a former, pneumatic apparatus for engaging a blank, said pneumatic apparatus including a pump and means for operating the pump, and stopping mechanism for stopping the former and folding mechanism, the operating means of the pump continuing in operation independently of said stopping mechanism.

26. In a machine for folding collars and the like, a bed to receive a blank, automatic folding mechanism for infolding the edges of the blank, a former for defining the shape of the blank being folded, a cross-head carrying said former, automatic mechanism for moving said cross-head and former toward and from the bed, automatic stopping mechanism for stopping the machine when the former is in raised position, and means under the control of the operator for rendering said automatic stopping mechanism operative or inoperative at will.

27. In a machine for folding collars and the like, a bed to receive a blank, folding mechanism for infolding the edges of the blank, a former for defining the blank, a cross-head carrying said former, actuating means for moving said cross-head and former toward and from the bed, automatic feeding mechanism for feeding a blank into the machine when the former is in raised position, automatic stopping mechanism for stopping the machine when the former is in raised position, thereby enabling the operator to place blanks properly on the feeding mechanism, and manual stopping mechanism for stopping the machine at any point in its operation.

28. In a machine for folding collars and the like, a bed to receive a blank, folding mechanism for infolding the edges of a blank, a former for defining the blank, a cross-head carrying said former, actuating means for moving said cross-head and former toward and from the bed, automatic feeding mechanism for feeding a blank when the former is in raised position, automatic stopping mechanism for stopping the machine when the former is in raised position, and manual stopping mechanism for stopping the machine at any point in its operation.

29. In a machine for folding collars and the like, a bed to receive a blank, folding mechanism for infolding the edges of the blank, a former for defining the blank, a cross-head carrying said former, actuating means for moving said cross-head and former toward and from the bed, said folding mechanism and cross-head-actuating means normally operating continuously and automatically, and manual stopping mechanism for stopping the machine at any point in its operation.

30. In a machine for folding collars and the like, a bed to receive a blank, folding mechanism for infolding the edges of the blank, a former for defining the blank, and means for yieldingly pressing said former on the blank on said bed, when the former is resting thereon.

31. In a machine for folding collars and the like, a bed to receive a blank, folding mechanism for infolding the edges of the blank, a former for defining the blank, a cross-head carrying said former, movable means supporting said cross-head for raising and lowering the latter, the cross-head being loosely mounted on said supporting means, and springs carried by said supporting means in engagement with said cross-head for permitting the latter to yield under pressure whereby the weight of the former, cross-head, connected mechanism, and the resistance of said springs are all brought to bear upon the blank on the bed of the machine.

32. In a machine for folding collars and the like, a bed to receive a blank, folding mechanism for infolding the edges of the blank, a former for defining the blank, a cross-head carrying said former, rods vertically movable in the machine for supporting and actuating said cross-head, horizontally-operating rods mounted in the cross-head for actuating said former, levers for shifting said horizontal rods, the latter and said levers having loose, vertically-sliding connection permitting the proper movements of each without interfering with the vertical movement of the cross-head.

33. In a machine for folding collars and the like, a bed to receive a blank, folding mechanism for infolding the edges of the blank, a former for defining the blank, a cross-head carrying said former, said cross-head having transverse slideways on its under side, and said former having connection with said slideways for front and back shifting movement in the machine, and shifting means therefor.

34. In a machine for folding collars and the like, a bed to receive a blank, folding mechanism for infolding the edges of the blank, a former for defining the blank, a cross-head carrying said former, the latter being capable of shifting backward and forward relatively to said cross-head, a rotary plate mounted in the cross-head, a slide-bar provided with cam-slots coöperating with the cross-head and former for shifting said former, a pin projecting from said rotary plate into loose connection with said slide-bar for reciprocating the latter, a horizontally-moving member for rotating said plate, and means for operating said member.

35. In a machine for folding collars and the like, a bed to receive a blank, folding mechanism for infolding the edges of the blank, a former for defining the blank, a cross-head carrying said former, slides on said cross-head, a rotary plate mounted in the cross-head, links connecting said plate and said slides, said slides being connected with contractible portions of the former, a rod mounted in the cross-head for longitudinal movement, a link connecting said rod and said rotary plate, and means for operating said rod.

36. In a machine for folding collars and the like, a frame, a bed carried thereby, a former, an edge-folding mechanism for infolding the edges of a blank, a single main shaft mounted in said frame, rotative members and levers for raising and lowering said former and operating said folding mechanism, all of said rotative members being mounted on said single shaft.

37. In a machine for folding collars and the like, a frame, a bed carried thereby, a former, means for raising and lowering said former relatively to said bed, end and edge folding mechanism for infolding the edges of a blank, a single main shaft mounted in said frame, levers for operating each of said end-folding mechanisms, levers for operating said edge-folding mechanism, cams mounted on said main shaft, all of said levers being directly connected to the folding mechanism at one end and at their other ends being in engagement with said cams, whereby all the folding movements of the machine are accomplished by the rotation of one shaft and the cams secured thereon, reciprocating rods for operating said former, levers pivotally mounted for reciprocating said rods, and a cam mounted on said main shaft in engagement with said levers for operating the latter.

38. In a machine for folding collars and the like, a frame, a bed carried thereby, folding mechanism on said bed for infolding a blank, a former, a cross-head carrying said former, supporting means for lifting and lowering said cross-head, a single main shaft mounted in said frame, said shaft always rotating in one and the same direction, cams mounted on said shaft for operating said folding mechanism, cams also mounted on said shaft for operating said cross-head-supporting means, other cams also on said shaft for operating said former, and pivotal connections between and for operating said folding mechanism from said cams, and other pivotal connections between and for operating said former from its said cams.

39. In a machine for folding collars and the like, a frame, a bed thereon, means for holding a blank on said bed, and end and edge folders for infolding the edges of said blank, a pivoted lever for lifting and depressing each of said folders, a pivoted lever for moving in and out each of said folders, a main shaft journaled in said frame, and cams fast on said shaft, each of said levers having engagement with certain of said cams whereby all the said movements of all of said folders are effected by said cams from said single shaft and are transmitted by said pivoted levers.

40. In a machine for folding collars and the like, a frame, a bed thereon to receive blanks to be folded, and an end folder for folding a portion of said blank, said end folder being adjustably mounted for movement longitudinally of said bed, a main shaft journaled in the machine, a cam adjustably mounted on said shaft, transmitting devices between said cam and said folder for actuating the latter by the former, and rigid connection between said folder and said cam for preventing longitudinal movement of one relatively to the other, and maintaining corresponding movement in both when either is adjusted.

41. In a machine for folding collars and the like, a frame, a bed thereon to receive blanks to be folded, and an end folder for folding a portion of said blank, said end folder being adjustably mounted for movement longitudinally of said bed, a main shaft journaled in the machine, a cam adjustably mounted on said shaft, transmitting devices between said cam and said folder for actuating the latter by the former, and a rigid leg connected to said folder and having at its lower end interlocking engagement with said cam for preventing dissimultaneous adjustment of said folder and cam.

42. In a machine for folding collars and the like, a bed and bed-frame to receive a blank to be folded, an end folder for folding said blank, said end folder including a block rigidly mounted in the bed-frame of the machine, a plate pivotally mounted on said block, movable means on said plate for doing infolding, means for lifting and depressing said plate, and mechanism for shifting said folding means in and out.

43. In a machine for folding collars and the like, a bed and bed-frame to receive a blank to be folded, said bed-frame having a recess or opening, a folder said folder including a block slightly smaller than the recess in said bed-frame, said block being mounted in said recess or opening of the bed-frame, and a plurality of adjusting devices in said bed-frame at the opposite sides of said block and engaging the latter for adjusting the block as may be required.

44. In a machine for folding collars and the like, a bed to receive a blank to be folded, means for holding the blank in position, and a folder, said folder comprising a plate, a blade mounted thereon and made up of two members pivoted together and mounted to slide longitudinally on said plate, coöperating pin and cam-slot devices in said plate and in said two blade members for automatically swinging said members on their pivot, as they are moved forward and backward on said plate.

45. In a machine for folding collars and the like, a bed to receive a blank to be folded, two folders for infolding said blank, means for moving said folders inwardly along converging lines, said folders being separated by an intervening gap when in retracted or nonfolding position, and said gap being gradually lessened in extent as the folders move inwardly, combined with yielding means adjacent the folding edges of said folders for closing said gap and adapted to move inwardly as one or both of said folders are moved inwardly for infolding the portion of the blank between the two folders.

46. In a machine for folding collars and the like, a bed to receive a blank to be folded, a plurality of folders for infolding the edges of said blank, said folders moving toward the blank out of parallelism, and means for maintaining a substantially continuous folding edge throughout said plurality of folders.

47. In a machine for folding collars and the like, a bed to receive a blank to be folded, a plurality of folders for infolding the edges of said blank, said folders moving toward the blank out of parallelism, and auxiliary folders for automatically closing the gaps between said folders and maintaining a substantially continuous folding edge.

48. In a machine for folding collars and the like, a bed to receive a blank to be folded, two folders, means to move said folders inwardly along converging lines, and an auxiliary folder longitudinally movable of one of said folders and projecting adjacent the edge thereof against the adjacent edge of the other folder, and means permitting the retraction of said auxiliary folder as and by the inward movement of said other folder.

49. In a machine for folding collars and the like, a bed to receive a blank to be folded, a folder for infolding an edge of the blank, an auxiliary folder slidingly mounted in said folder and projecting therefrom in substantial alinement with the edge thereof, a spring normally maintaining said auxiliary folder projected, and means for moving the same inwardly in performing the folding operation.

50. In a machine for folding collars and the like, a bed to receive a blank to be folded, opposite end folders, and an intermediate side edge-folder for folding respectively the two ends and intermediate longitudinal edge of the blank, mechanism for simultaneously moving inwardly said three folders for making a continuous folded edge on three sides of the blank, said three folders being in separated position before their inward movement and means for automatically preventing the material between said folders from being pinched or deformed by the latter as the said folders move simultaneously inwardly.

51. In a machine for folding collars and the like, a bed to receive a blank to be folded, a folder movable over said bed, a presser device secured to said folder, a cam mounted beneath said bed, a lever pivoted to the under side of said bed and connected to said presser device, said lever having an arm operated by said cam, a second lever connected at one end to said folder for moving the same horizontally, and at its other end engaged by said cam.

52. In a machine for folding collars and the like, a bed to receive a blank to be folded, opposite edge-folders, a cam journaled in the machine beneath said bed, a presser device secured to each of said folders and passing beneath said bed, and similar levers pivoted to said presser devices and bed and passing in opposite directions about said cam to be actuated thereby.

53. In a machine for folding collars and the like, a bed to receive a blank to be folded, opposite edge-folders, a cam journaled in the machine beneath said bed, a presser device secured to each of said folders and passing beneath said bed, similar levers pivoted to said presser devices and bed and passing in opposite directions about said cam to be actuated thereby, and other levers respectively pivoted at the front and rear sides of the machine and connected at their upper ends to said respective folders, and at their lower ends engaged by said cam for shifting the said folders for folding.

In testimony whereof we have signed our names to this specification in the presence of two subscribing witnesses.

WILLIAM W. DIXON.
WALTER L. DIXON.

Witnesses:
GEO. H. MAXWELL,
GEORGE B. BIGELOW.